United States Patent
Thomas et al.

(10) Patent No.: US 6,339,598 B1
(45) Date of Patent: Jan. 15, 2002

(54) METHOD OF OPERATING A DIGITAL TRANSMISSION LINK TIME-SHARED BY A PLURALITY OF UNITS AND UNIT FOR IMPLEMENTING THE METHOD

(75) Inventors: Gérard Thomas, Eragny sur Oise; Luc Brignol, Paris; Florence Humen, Argenteuil; Daniel Lecomte, Paris, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/138,654

(22) Filed: Aug. 24, 1998

(30) Foreign Application Priority Data

Aug. 25, 1997 (FR) .............................. 97 10603

(51) Int. Cl.⁷ .............................................. H04B 7/212
(52) U.S. Cl. ..................... 370/442; 370/438; 370/431
(58) Field of Search .................. 370/362, 395, 370/397, 431, 439, 442, 438, 364, 360, 462, 416; 710/113, 116, 241, 107

(56) References Cited

U.S. PATENT DOCUMENTS

| 5,416,910 A | * | 5/1995 | Moyer | 710/113 |
|---|---|---|---|---|
| 5,425,022 A | * | 6/1995 | Clark | 370/306 |
| 5,452,330 A | | 9/1995 | Goldstein | |
| 5,572,686 A | * | 11/1996 | Nunziata | 710/116 |
| 5,727,171 A | * | 3/1998 | Iachetta | 710/107 |
| 5,732,079 A | * | 3/1998 | Castrigno | 370/362 |
| 5,751,974 A | * | 5/1998 | Blackwell | 710/121 |
| 6,061,348 A | * | 5/2000 | Castrigno | 370/363 |
| 6,115,374 A | * | 9/2000 | Stonebridge | 370/362 |

FOREIGN PATENT DOCUMENTS

| WO | WO 97/01257 | 1/1997 |
|---|---|---|
| WO | WO 97/15993 | 5/1997 |

\* cited by examiner

*Primary Examiner*—Douglas Olms
*Assistant Examiner*—Ricardo M. Pizarro
(74) *Attorney, Agent, or Firm*—Sughrue Mion, PLLC

(57) ABSTRACT

A link for transmitting digital information is time-shared between a plurality of units under the control of one of the units called the control unit. The control unit communicates with the other units by means of individually addressed signaling cells enabling it to interrogate each unit regularly as to its current status and its requirements for communication via the link and to advise it of at least one particular frame time slot for sending a response and others for sending cells. The invention also concerns units for implementing this method.

9 Claims, 2 Drawing Sheets

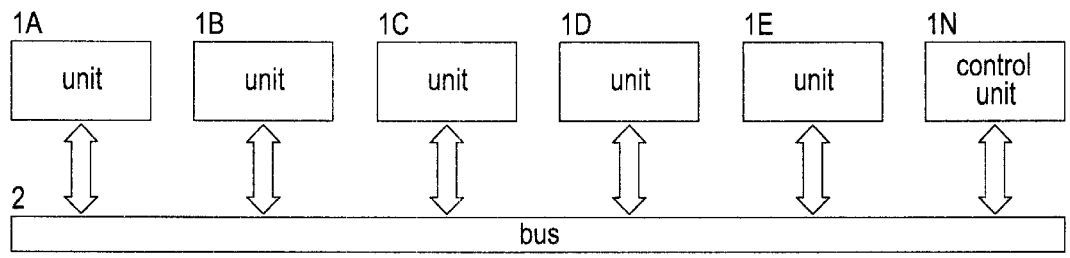
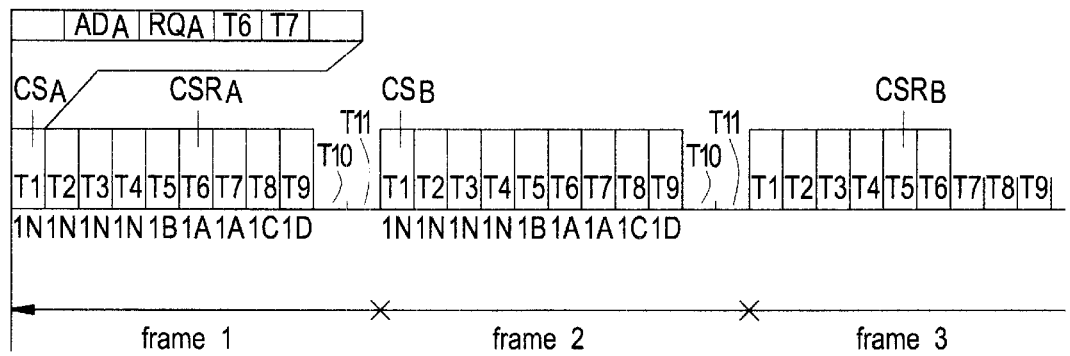
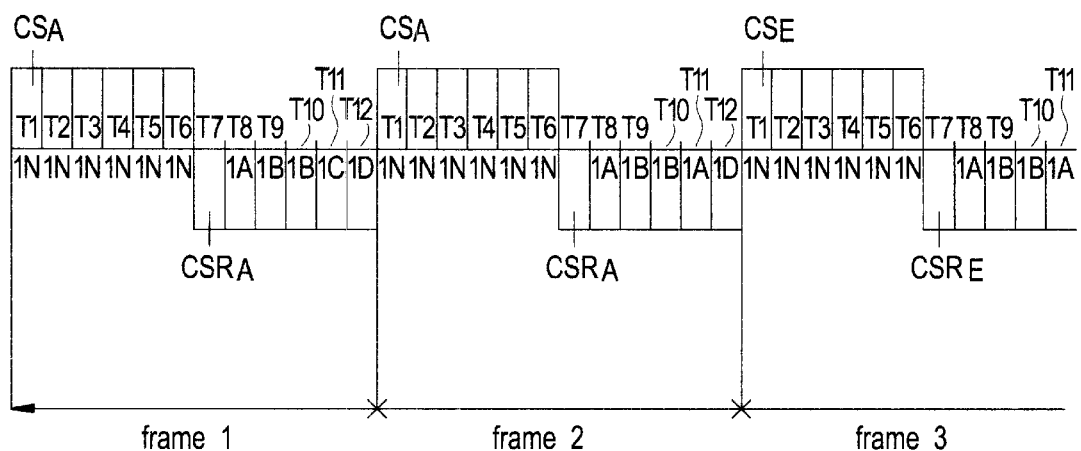

METHOD OF OPERATING A DIGITAL TRANSMISSION LINK TIME-SHARED BY A PLURALITY OF UNITS AND UNIT FOR IMPLEMENTING THE METHOD

BACKGROUND OF THE INVENTION

1. Field of the Invention

The invention concerns a method of operating a digital transmission link, of the radio or cable bus type, time-shared by a plurality of units under the control of one of the units for exchanging communication signals. It also concerns units equipped to implement the method.

2. Description of the Prior Art

The use of a transmission link by a plurality of units to exchange communication signals generally implies sharing the transmission capacity available by virtue of the link to give the units communication facilities optimally matched to their requirements.

In the case of a time-shared link, each unit producing communication signals must have temporary use of the link to send and a hardware and/or software structure must therefore be provided for distributing transmission times to the units.

A structure of the above kind in practise implies the generation of clock signals to control sending by the units and it is beneficial to produce synchronization signals to facilitate the sharing of the link by the units, for example to produce such signals periodically.

A frame type temporal organization for operating a link implying periodic production of synchronization signals to which the units can synchronize in order to send and receive data at times determined by the distribution structure relative to the synchronization signals and clock signals is known in itself. The times allocated to a unit for sending can be divided in time within successive time frames during each of which the unit is reserved the same number of successive instants, for example eight such instants, defining a module, the modules used by a unit for sending being temporally disposed in an identical manner in the successive frames that contain them. An organization of the above kind enables synchronous transmission of communication signals, and in particular of PCM encoded speech signals or data, using one or more transmission channels each corresponding to one or more modules identically disposed in successive frames. It is more specifically suited to transmitting information from units with respective regular bit rates or with respective bit rates that can be regularized by buffering before transmission if the link does not provide for real time transmission at a sufficiently high bit rate.

It is therefore difficult to use links of the above kind for bit rates that vary significantly unless the bit rates chosen for the links are high enough to accommodate peaks, which is not necessarily acceptable from the economic point of view.

For various reasons there is not necessarily a good match between the requirements of the units and the means making bit rate available to them at different times.

In another form of organization for transmitting packets of digital data or digitized signals that is known in itself, the instants allocated to a unit for sending can be successive, generally with at least a limitation as to the number of successive instants that can be allocated to the same unit. As in the case of cell type packets, the limitation on the number of successive instants allocated to the same unit can enable asynchronous transmission under specified conditions of signals intended to be transmitted synchronously, such as PCM samples relating to a telephone call. It is also possible to transmit information temporarily arriving at a high bit rate because the number of successive instants that can be obtained by a unit for sending is much greater than that obtained with the organization referred to above and because the flow of information for this unit can resume sooner if the number of units wanting to send on the transmission link is low and their respective bit rate requirements are low. However, there is again not necessarily a good match between the requirements of the units and the means making bit rate available to them at different times. In the present instance, this is in particular a consequence of the fact that the organization governing a link operated in packet or cell mode takes account only of requests submitted by units wanting to send, without actually knowing the nature of the requirements that these requests reflect. In some cases at least, for example in the case of units that can be operated as multimedia terminals, the variations in bit rate and conditions of operation of the same unit can vary greatly depending on the use that is made of them.

SUMMARY OF THE INVENTION

The invention therefore proposes a method of operating a link for transmission of digital information time-shared between a plurality of units under the supervision of a control unit that is one of said units assuring arbiter and/or manager functions and controlling transmission of cells between units in frames defined by clock and synchronization signals used by said units in which method said control unit communicates with the other units by means of individually addressed signaling cells for regularly interrogating each of said other units by means of requests relative to its current status and to its communication requirements using said link, and for indicating to it at least one particular frame time slot for its response to the request received and for sending, and each unit having received a signaling cell containing a request from said control unit responds by sending a response signaling cell in a frame time slot as defined by said control unit to specify its status and its requirements.

The invention also proposed a unit for use in a set of units time-sharing a link for transmitting information in digital form under the supervision of one of said units, hereinafter referred to as the control unit, assuring arbiter and/or manager functions and controlling transmissions effected by means of cells between units in cells in the context of the frames defined by clock and synchronization signals processed by said units, including hardware and software means for implementing the above method.

The invention, its features and its advantages are explained in the following description with reference to the figures listed below.

BRIEF DESCRIPTION OF THE DRAWINGS

FIG. 1 is a schematic representation of a system comprising a set of units and a common transmission link.

FIG. 3 is a diagram showing the distribution of cells relating to a cable link.

FIG. 4 is a diagram showing the distribution of cells relating to a radio link having a control unit serving as a repeater.

DETAILED DESCRIPTION OF THE PREFERRED EMBODIMENT

Figure 2:
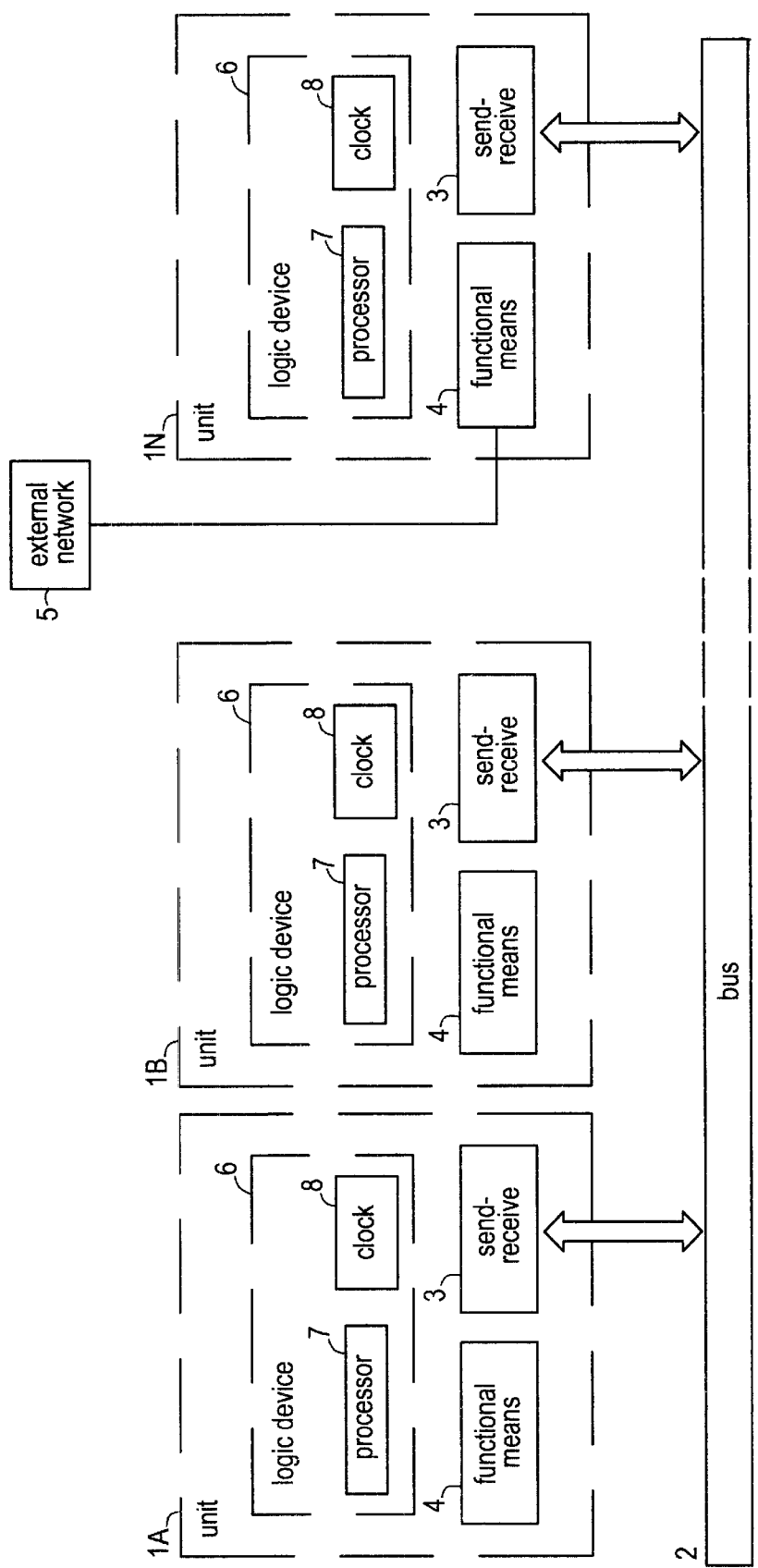
FIG. 2 is a schematic representation of the essential components of the above units.

The system shown in FIG. 1 includes a set of units 1A, 1B, 1C, 1D, 1E, . . . , 1N equipped to share a common link 2 operated as a bus. As mentioned above, the link 2 can be an electrical (cable) bus, an optical bus or a logical bus transmitting signals between units by radio.

The units of the above set are succinctly defined with reference to FIG. 2. They can have highly diverse functions and in particular functions to generate, output and/or transmit information in various forms, for example to serve multimedia terminals. The units have the common feature of including send-receive means 3 enabling them to communicate via the link 2 with the other units of the set served by the link. The send-receive means 3 are or include a cable bus input-output interface if the link 2 is a cable link. They are or include a radio transceiver if the link between the units of the set 1 is a radio link.

The send-receive means 3 of a unit of the set 1 are connected to functional means 4 corresponding to at least one function devolved on the unit, for example communication interface means in the case of a unit, e.g. unit 1N, enabling at least one of the units of the set to communicate via an external telecommunications network 5 with one or more units that are not part of the set 1 of units.

Each unit of the set 1 of units is controlled by a logic device 6 based on at least one processor 7 and one clock device 8.

In this embodiment, one of the units of the set 1, for example unit 1A or possibly unit 1N, is organized to act as an arbiter or manager vis à vis other units with regard to operation of the link 2 that the units (here 1A, 1B, . . . , 1N) share and consequently to control the set formed of the link and the units. This control unit uses clock and synchronization signals produced for the purposes of transmission over the link 2 by a clock device, for example the clock device 8 of said control unit, the design of which will be evident to the skilled person.

In this embodiment, the clock device produces transmission and synchronization clock signals which are used to define the transmission time frame on the transmission link and to which all the units are synchronized in a manner that is known in itself, whether the link is a cable or radio link. In the case of a control unit 1N connected to a public telecommunication network, it is preferably the clock of the latter that is used as a reference by the clock device 8 of the control unit for operation of the link 2.

The frame synchronization signals sent by the control unit are in this example supplied in the context of ATM cells enabling the clock devices of the other units of the set 1 to synchronize to the control unit in order to send and/or to receive via the link 2.

The logic device 6 of the control unit includes a processor 7 programmed to address each of the other units by means of signaling cells sent by the control unit. This is intended to enable the control unit to determine the status and the requirements of each of the other units within a time-delay short enough to correspond to real time operation, if necessary. An initial configuration phase informs the control unit as to the respective requirements and nature of each of the other units connected to the same link 2 as itself. This information phase can be carried out on-line by exchange of information between the control unit and each unit of the set 1 of units served by the link 2. Among other things, this indicates the synchronous and/or asynchronous transmission mode or modes that a unit may require for a particular call or call phase, together with the intended bit rates for the call.

This information can be obtained and updated by the control unit which for this purpose sends signaling cells CS, e.g. cells $CS_A$ and $CS_B$ in FIG. 3, to the units with which it wishes to communicate.

The units served by the link 2 are assigned individual addressed AD, e.g. addresses $AD_A$, $AD_B$, $AD_N$, enabling the control unit to individualize the signaling cells that it sends and consequently to formulate requests RQ, e.g. request $RQ_A$, specifically adapted to suit the type of unit and the information obtained, in particular following at least one previous request, relating to the known status and to the foreseeable requirements of that unit. The rate at which the control unit sends signaling cells to the other units is specifically adapted to the requirements of that unit as can be deduced from information received and stored by the logic device of said control unit. A unit sending regularly with a regular bit rate does not imply the same level of surveillance as one subject to high and sudden variations in bit rate.

In this embodiment the control unit indicates at least once in a signaling cell sent to a unit the time a position T of the allocated time slot or slots, e.g. time slots T6 and T7 for unit 1A, for sending of cells by that unit during at least one of the transmission frames on the link 2. This concerns not only the sending of signaling cells by each unit at the request of the control unit in response to receiving a signaling cell addressed to said unit by said control unit but also to the cells, hereinafter referred to as information communication cells, sent by a unit for the purposes of an application that it serves.

The control unit incorporates into a signaling cell for another unit indications relating to the time slots temporarily reserved to the other unit for sending cells. This enables the control unit to divide the bit rate offered by the transmission link between the units in the manner best suited to the known requirements of those units at a given time. By sending appropriate signaling cells it is therefore possible to modify the allocation of time slots to the units, for example to allocate to a unit temporarily requiring a high bit rate time slots until then allocated to one or more other units having more modest or less pressing requirements.

In this embodiment this implies that the units must respond to the requests contained in the signaling cells addressed to them individually. To this end, when the control unit has sent a cell including a request to another unit it waits for the latter unit to respond. The response is expected in the time slot fixed by the control unit and indicated by the control unit in the signaling cell containing the request. The response may arrive in the same frame as the request cell from the control unit that instigated it if the unit can respond rapidly, and in particular if the information required is immediately available. For example, this is possible with a high bit rate unit with means chosen for their performance. This is the response included in the cell $CSR_A$ sent in time slot T6 allocated to unit 1A that is sent in response to the request $CS_A$ sent by control unit 1N during frame 1, as symbolically represented in FIG. 3. Frames 1, 2 and 3 as represented here are not necessarily in immediate succession.

It is also possible for the response to arrive in the frame time slot indicated during a closely following frame if the conditions referred to above are met only in part, for example for hardware reasons. This is the case in the response $CSR_B$ sent by unit 1B in time slot T4 of frame 3 following the request formulated by control unit 1N in cell $CS_B$ sent during time slot T1 of frame 2.

A maximal waiting time threshold can be set, if necessary, to enable the control unit to send a new request to a unit other than that from which a response is awaited should the response be delayed in a manner that reflects a malfunction.

As indicated hereinabove, reception by the control unit of information relating to the status and to the requirements of other units that it obtains from the latter in response to its requests and the taking into account of that information in conjunction with other information acquired previously, and in particular in the configuration phase, enables a distribution of time slots enabling cells to be transmitted over the link 2 in successive time frames. This distribution is effected under conditions determined by programming, using techniques well known to the skilled person. Here the programming is done at the level of the control unit logic device, which is in communication with the logic devices of the other units.

Cells are always sent by one unit to another unit in the context of a call between the two units under the control of the control unit. As mentioned above, the control unit is responsible for defining the sending time slots then allocated to at least one of the two units for the call concerned. It is understood that this distribution is likely to change during the call if the requirements for communication via the transmission link 2 employed lead the control unit to decide this. In the example shown in FIG. 3, time slots T1 through T4 of frame 1 are reserved for sending by the control unit, i.e. unit 1N, time slots T6 and T7 are reserved for sending by unit 1A, time slots T5, T8 and T9 are assigned to sending by the respective units 1B, 1C and 1D, time slots T10 and T11 not being reserved.

A calling unit signals its calling status and its requirements to the control unit in a signaling cell sent to the control unit in response to a request sent out in signaling cells transmitted regularly, for example cyclically or quasi-cyclically, by said control unit to said calling unit. These requirements are defined in particular by a unit address to call, indications as to the synchronous or asynchronous nature of the transmission, the bit rate, the type of encoding, etc. The called unit can be the control unit itself, in particular if the control unit is one providing an interface with an external communication network, as indicated for the unit 1N that is connected to an external communication network 5.

Depending on certain conditions and in particular on the respective natures of the units, i.e. calling or called, the requirements of the calling unit in terms of bit rate can either be deduced directly by the control unit from the address of the called unit or from that of the calling unit or imply the provision of additional information by the calling unit and/or by the called unit in the context of the signaling cells that each of these two units have to send to the control unit if neither of them is the control unit.

For example, the calling unit can indicate that it requires, or wants, a particular minimum bit rate, especially if the bit rate concerned is high. Here this information is transmitted in a first signaling cell transmitted by the calling unit to the control unit after a request by the latter in a signaling cell following on from the appearance of the call request at the level of said calling unit. This information is acted on at the control unit which can compare it with that supplied by the called unit, if necessary. This is necessary if the bit rate accepted by the called unit may differ from that requested by the calling unit, for example.

Based on the information that it then holds relative to the requirements and to the operating possibilities of the link 2, the control unit then decides which time slots will be reserved for sending by one and/or the other two units involved in the requested call. The decision taken by the control unit remains valid as long as no request from one of the units served by the link 2 implies modification of the distribution of time frames to the various units communicating at the time, regardless of the stage the call has reached.

At the receiving end, each unit conventionally recovers the cells transmitted by the link that include its individual address in their header, or possibly a group address if said unit shares an address with other units of the set including them, which is standard practise in this art.

In one embodiment, the control unit can indicate in the signaling cells that it sends to a unit the time slots in which the cells to be acted on by that unit are transmitted and in particular the information communication cells referred to above.

In some cases it ma be advantageous to allocate successive time slots to units whose sending of cells implies the use of more than one time slot if a link 2 has two physical transmission media, as is routinely the case with cable links. This becomes a preferred solution if the link 2 always transmits from one unit to one or more other units without allowing any other simultaneous transmission. This is the case with half-duplex single-channel links, in particular radio links having only one radio channel used by each unit in succession to send and to receive.

A control unit in charge of the link usually operating as a repeater includes sending means giving it a range greater than that of the other stations. It can therefore receive properly all transmissions from other units which are less powerful, for example for economic reasons. Consequently it is able to forward transmissions from said other stations under conditions that are more satisfactory for the intended receiving units.

In the above configuration the control unit can be regarded as a kind of server. It introduces a buffer effect between the other units, in the sense that transmissions from the latter are recovered by the receiving means of the control unit and then forwarded by the control unit. Cells sent by units other than the control unit, which contain as standard in their respective header the address or addresses of the units to which they are sent, are then forwarded by the control unit to the receiving units.

Cells sent by the units and forwarded by the control unit are preferably kept unchanged. The information needed to route them correctly is transferred in signaling cells that the units send to the control unit under conditions established by the latter and in response to the requests that it includes in the signaling cells it sends.

Under conditions similar to those already mentioned above, in one preferred embodiment of the invention the control unit can advise the receiving units of the time position of the time slots during which the cells addressed to them are sent.

As indicated above, and given that the send-receive means of the units have to switch alternately from a sending state to a receiving state, there is provision for providing a guard time, for example of at least one time slot, between sending by the control unit and sending by the other units and/or vice versa. There is also provision for a time slot duration slightly greater than that needed to send a cell. This it to allow for any disparities between units.

FIG. 4 shows one non-limiting example of distribution of time slots between units employing a half-duplex radio link and shows three frames 1, 2 and 3.

Given that all units using the link have a particular number of time slots, here denoted T1 through T12, in each frame and that the bit rate requirements of the units are defined, there is an initial distribution shown by way of example in relation to frame 1. Here there is provision for at least some of the units to have it rate requirements that are not always the same and that can lead to them wishing to send a plurality of successive cells during the same frame if the distribution of time slots then applicable allows this, for example. It is also feasible for not all of the requirements of the units to be met simultaneously, as is standard practise in telecommunications. This approach is acceptable provided that the intended mode of operation does not imply permanent sending by all units at their maximal bit rate.

In the case of frame 1 shown in FIG. 4, the time slots are divided into two groups of potentially variable size, one being specific to the control unit for its own requirements and for forwarding information communication cells to other units, the other group being shared by units sending cells other than the control unit.

In the example shown, time slot T1 of frame 1 is reserved for one of the signaling cells CS sent by the control unit, for example cell $CS_A$ sent to unit 1A. Here time slots T2 through T6 are respectively and initially reserved for information communication cells forwarded by the control unit after first being sent by the other units. In the example shown, time slot T2 of frame 1 is allocated to forwarding by the control unit of a cell from unit 1A, time slots T3 and T4 to forwarding by the control unit of cells from unit 1B, time slot T5 to forwarding of a cell from unit 1C and time slot T6 to forwarding of a cell from unit 1D. Time slot T7 is for sending by one of said other units, here unit 1A, of a response signaling cell $CSR_A$ sent by unit A in response to the request from the control unit contained in cell $CS_A$ sent in time slot T1. This time slot is shown inverted in FIG. 4 to symbolize the switching of the modems in said other units to send mode from their previous receive mode.

A guard time, not shown, is provided to allow for this changeover. Because the propagation and response times of the units are not exactly the same, time margins, not shown, are provided to assure in particular that cells sent by said other units to the control unit can be processed entirely by the latter. One consequence of this, for example, is that the numbers of clock periods considered are different for receiving a control unit cell and a cell from another unit, the number being lower for cells from the control unit.

Time slots T8 through T12 of frame 1 are here allocated to units 1A, 1B, 1C, 1D under the same conditions as applied to time conditions T2 through T6, i.e. slot T8 to unit 1A, slots T9 and T10 to unit 1B, and so on. It must be understood that this does not necessarily imply that these units use the time slots initially assigned to them (see below).

Time slot T7 of frame 1 was used by unit 1A to send a request for an additional send time slot to the control unit in a response signaling cell. The control unit then looks for a time slot not used by the unit and then allocates it to that unit; in the example shown this period is period T11 allocated until then to unit 1C. A new signaling cell $CS_A$ is then sent by the control unit to unit 1A to tell it the position of the additional time slot allocated to it, i.e. period T11 in this case. Here the new signaling cell is sent during time slot T1 of frame 2. The allocations of time slots T2 through T4 and T6 of frame 2 are identical to those of the corresponding periods of frame 1 except that time slot T5 initially allocated to forwarding a cell from unit 1C is re-allocated to unit 1A.

Unit 1A forwards a response signaling cell $CSR_A$ having an acknowledgment function in time slot T7 allocated to it again for this purpose by the control unit. Time slots T8 through T10 and T12 of frame 2 retain the same allocations as the corresponding slots of frame 1, in which case slot T11 is used by unit 1A to send a second cell during frame 2, the first having been sent during time slot T8, as already mentioned.

In the case of frame 3, the time slot T1 is used by the control unit to send a signaling cell $CS_E$ to unit 1E which is not sending at this time to verify that the unit does not have any requirements awaiting attention. Time slots T2 through T6 and T8 through T12 have the same allocation as previously. Unit 1E sends a response signaling cell $CSR_E$ required by the control unit in the time slot T7 indicated to it by the control unit for this response.

It is naturally possible to modify the distribution of time slots to the units by the allocation method described above so that two cells sent by the same unit are sent and/or forwarded during successive time slots in each frame.

It should be understood that it is possible to limit the bit rate of one unit, then deemed to be a secondary unit, to the benefit of a higher priority unit by reducing or even temporarily canceling the number of channels allocated to that unit considered as a secondary unit temporarily, possibly periodically.

It must also be understood that it is also possible to modify the number of time slots reserved for sending by the control unit and the other units in various ways by means of the method in accordance with the invention. In particular, it might be possible to modify the position of the switching times which in the example described correspond to the ends of time slots T6 and T12. In particular, this can increase the bit rate for at least one unit in the case where the small number of units actually sending in a given period allows this. In one example, not shown, the distribution of time slots to the units can be such that the switching times are separated by only four time slots, rather than six as previously, for example, enabling all of the time slots to be used for units sending at this time.

What is claimed is:

1. A method of operating a time-shared link, for transmission of digital information in frames defined by clock and synchronization signals, between a plurality of units, one of said plurality of units being a control unit, said method comprising:

communicating between said control unit and with others of said plurality of units by means of individually addressed signalling cells;

regularly interrogating each of said others of said plurality of units by means of requests relative to a respective current status and to respective communication requirements using said link, said requests being carried in said signalling cells;

receiving one or more replies to said requests, each reply being in one of said signalling cells and defining response signalling cells and indicating said respective current status and said respective communication requirements; and indicating to said others of said plurality of units, in response to said replies, a particular frame time slot for sending;

wherein each of said others of said plurality of units sends response signalling cells in a frame time slot defined by said control unit.

2. The method of operating as set forth in claim 1, wherein said control unit sends to said others of said plurality of units signalling cells indicating the position of one or more frame time slots temporarily allocated by said control unit for said others of said plurality of units to send cells.

3. The method of operating as set forth in claim 2, wherein the temporary allocation of said one or more frame time slots is modified in response to a change in one or more of said respective current status and said respective commuinications requirements indicated in said response signalling cells.

4. The method of operating as set forth in claim 1, wherein said control unit sends signalling cells, to all of said others of said plurality of units receiving information supplied by another unit, indicating one or more frame time slots used by said another unit for sending information communication cells.

5. The method of operating as set forth in claim 1, wherein said control unit sends signalling cells to said others of said plurality of units with a recurrence determined unit by unit.

6. The method of operating as set forth in claim 1, wherein said respective communications requirements, in terms of sending bit rate, are stored in said control unit in association with a respective corresponding address.

7. The method of operating as set forth in claim 1, wherein revealed requirements, in terms of sending bit rate at the level of at least a given one of said others of said plurality of units, are transmitted by means of a signalling cell sent by said given one of said others of said plurality of units in response to the one of said requests received in a signalling cell sent by said control unit after said respective communications requirements have been determined by said others of said plurality of units at the revealed level.

8. The method of operating as set forth in claim 1, wherein transmission via said transmission link is half-duplex transmission, said control unit sends its cells to said other units in successive frame time slots that it allocates, and said other units respectively send their cells in frame time slots respectively allocated to them, successively for each unit having use of more than one time slot, and temporarily disassociated from the time slots used by said control unit.

9. A unit including hardware and software means for implementing the method of operating as set forth in claim 1.

* * * * *